L. MOORE.
THILL-COUPLING.

No. 175,135. Patented March 21, 1876.

WITNESSES:
John Goethals
Alfred Turcott

INVENTOR:
L. Moore
BY
ATTORNEYS.

UNITED STATES PATENT OFFICE.

LEVI MOORE, OF BARABOO, WISCONSIN, ASSIGNOR TO HIMSELF AND WILLIS B. RICH, OF SAME PLACE.

IMPROVEMENT IN THILL-COUPLINGS.

Specification forming part of Letters Patent No. 175,135, dated March 21, 1876; application filed February 28, 1876.

*To all whom it may concern:*

Figure 1:
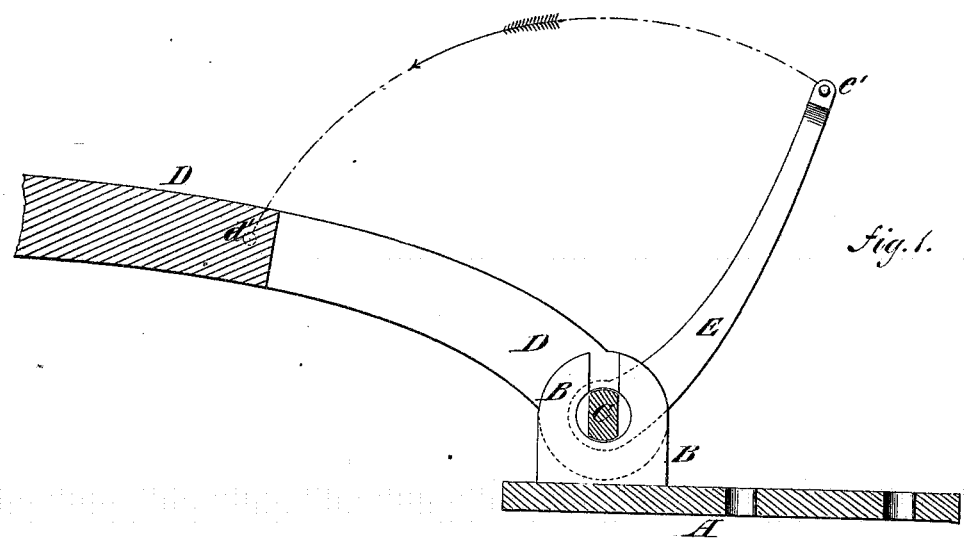
Figure 2:
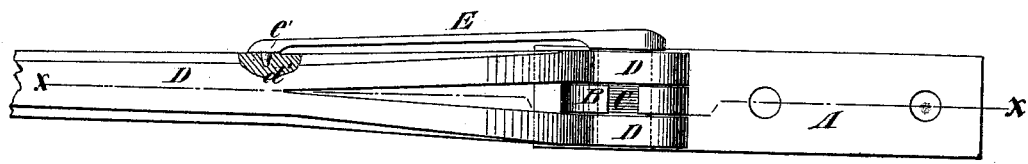

Be it known that I, LEVI MOORE, of Baraboo, in the county of Sauk and State of Wisconsin, have invented a new and useful Improvement in Thill-Coupling, of which the following is a specification:

Figure 1 is a longitudinal section of my improved coupling, taken through the line $x\ x$, Fig. 2, and showing the coupling unlocked. Fig. 2 is a top view of the same, locked.

Similar letters of reference indicate corresponding parts.

The object of this invention is to furnish an improved device for connecting thills and poles to the axles of vehicles, which shall be so constructed as to enable the thills or pole to be easily and quickly detached without the use of any wrench or tool, and which, when locked, will hold the thills securely.

The invention consists in the spring-bar provided with the point or pin and the flattened pin or bolt, in combination with the thill-iron provided with the hole, and the perforated and slotted lug formed upon the yoke of an axle-clip, as hereinafter fully described.

A represents the yoke of an axle-clip, which is secured to the bow of the clip by nuts in the usual way. Upon the middle part of the upper side of the forward end of the yoke A is formed a lug, B, of such a width as will give a sufficient bearing to the pin or bolt C of the thill-iron D. Through the center of the lug B is formed a round hole to receive the pin or bolt C, and from which a slot of a less width than the diameter of the said hole leads out through the top of the lug B. The rear end of the thill-iron D is slotted or forked to receive the lug B, and has a hole formed through it to receive the ends of the pin or bolt C. The middle part of the pin or bolt C is flattened, so that when turned edgewise it may be passed in and out through the slot of the lug B, and when turned crosswise cannot pass out through said slot. To one end of the pin or bolt C is rigidly attached the end of a spring-bar, E, which is curved to correspond with the curvature of the thill-iron D, and has a point or pin, $e'$, formed upon the inner side of its outer end to enter a hole, $d'$, formed to receive it in the side of the thill-iron D, where it is held securely by the elasticity of the said spring-bar E.

With this construction, by springing the point or pin $e'$ out of the hole $d'$ and turning the said spring-bar E up into the position shown in Fig. 1, the coupling will be unlocked, and the thills can be lifted off. The coupling is locked by turning the spring-bar E down parallel with the thill-iron D and springing the point or pin $e'$ into the hole $d'$.

Having thus described my invention, I claim as new and desire to secure by Letters Patent—

The spring-bar E, provided with the point or pin $e'$, and the flattened pin or bolt C, in combination with the thill-iron D, provided with the hole $d'$, and the perforated and slotted lug B, formed upon the yoke A of an axle-clip, substantially as herein shown and described.

LEVI MOORE.

Witnesses:
C. C. REMINGTON,
J. S. VAN ORDEN.